United States Patent Office

2,890,221
Patented June 9, 1959

2,890,221
METHOD FOR PREPARING NORMORPHINE

Henry Rapoport, Berkeley, and Melvin Look, San Francisco, Calif., assignors to the United States of America as represented by the United States Atomic Energy Commission No Drawing. Application July 24, 1957
Serial No. 673,988

1 Claim. (Cl. 260—285)

The present invention relates generally to the preparation of alkaloids and, more particularly, to an improved method for producing normorphine.

Normorphine has heretofore been produced by the degradation of morphine in a process in which morphine is first converted to heroin by acylation of hydroxy groups with acetic anhydride and treatment of the heroin with cyanogen bromide to form cyanonorheroin. Such compound is then converted to cyanonormorphine by hydrolysis in a potassium hydroxide solution and the cyanonormorphine is hydrolized in a hydrochloric acid solution to effect the removal of the cyano group and thus the conversion of cyanonormorphine to normorphine which is obtained as normorphine hydrochloride. Neutralization of this salt with ammonium hydroxide produces free base normorphine hydrate which is commonly referred to as normorphine as will hereinafter be understood. Calculated on the basis of the starting material, morphine, overall normorphine yields on the order of 50% are the best obtainable by this prior method. Normorphine is employed in the synthesis of various related compounds including N-allylnormorphine which compound is used in medical applications to counteract the depressant effects of morphine.

Now a new hydrolysis procedure has been discovered for effecting the more efficient and complete conversion of the acylated and cyanated intermediate morphine derivative in the foregoing method of synthesis. In such novel procedure the conventional hydrolytic operation employing a basic agent is dispensed with and a novel and unorthodox two stage acidic hydrolysis is substituted. In accordance with the invention hydrolysis of said intermediate is begun with a limited time hydrolytic treatment using concentrated mineral acid and completed with an extended subsequent treatment with dilute acid. The vastly improved results are most unexpected since the general view in the art is that an acidic hydrolyzing agent should only be used in dilute form. Not only is a much more complete conversion to the desired product obtained but the product may be obtained in a more easily purified state allowing production of purer derivatives. For example, the normorphine product can be remethylated to yield morphine in which it is certain that the composition is known. Also radiocarbon labeled methylating agent can be employed to produce morphine in which the exact location of the tracer carbon is known, for use, e.g., in metabolic studies. Likewise, a variety of derivative products such as N-allylnormorphine can be produced therefrom by conventional methods.

Accordingly, it is an object of the present invention to provide an improved method for the preparation of normorphine.

Another object of the invention is to provide an improved morphine demethylation method for the preparation of normorphine.

A still further object of the invention is to provide an improved process for hydrolizing the compound obtained by the acylation and cyanation of morphine, thus producing normorphine.

A further object of the invention is to employ concentrated mineral acid in a first hydrolysis step in hydrolyzing an intermediate compound to produce normorphine.

A still further object of the invention is to provide a process in which an acylated and cyanated morphine derivative is hydrolized in an initial treatment with a concentrated acid followed by a subsequent treatment with a dilute acid.

Other objects and advantages of the invention will become apparent on consideration of the following description.

Basically the conversion of morphine to normorphine involves the sequence of reactions represented by the following equations:

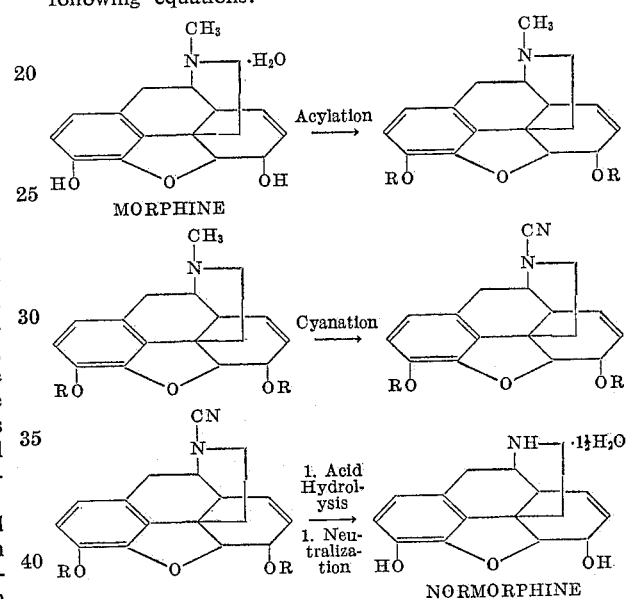

Where R=an acyl group.

Briefly, as shown in the above equations, the hydroxyl groups of morphine are converted to acyl derivatives to protect these groups against attack during subsequent demethylation. Then the acyl derivative is subjected to a cyanation operation to accomplish the replacement of the methyl group with a cyano group. The resultant product is then hydrolyzed by the two-stage acid hydrolysis procedure of the invention, whereby both the acyl groups and the cyano group are replaced by hydrogen. The net effect of the above reactions is the demethylation of morphine, and thus, the production of normorphine which forms an acid salt in the solution. Accordingly, hydroysis is followed by neutralization of the solution to produce the free normorphine.

More particularly as the first operation in the process of the invention, morphine is treated with a stoichiometric excess of an acylating agent to product therefrom a diacyl derivative of morphine. The particular acyl radical introduced at this point is not a critical factor in the process as the purpose of this acylation is simply to protect the morphine hydroxyl groups against attack during subsequent demethylation. Hence, any of the common acylating agents may be used for this purpose including acyl chlorides, acyl anhydrides, ketenes or carboxylic acids having as the acyl radical a formyl, acetyl, propionyl, benzoyl or other such group.

It will be found that the best yields of normorphine will be obtained by utilizing purified reactants for all operations and by continuing each operation for a length of time sufficient to insure as complete a reaction as possible between the reagents involved.

The manner in which morphine and this acyl compound are brought into contact depends both on the solubility of morphine in various reaction mediums and on the physical properties of the acyl reagent under the conditions chosen to perform this reaction. For example, a gaseous ketene may be bubbled through a solution of morphine, an acyl chloride may be dissolved in an inert solvent and mixed with morphine dissolved in an inert solvent, or solid morphine may be dissolved in a liquefied acyl anhydride or carboxylic acid. At any rate, an intimate mixture of morphine and the acyl compound is effected and, if an acyl compound other than a very reactive ketene is employed, this mixture is heated to a temperature sufficient to promote the acylation reaction.

It is preferred that a compound containing an acetyl radical be employed as the agent for acylating morphine, the resulting product being diacetyl morphine, or heroin, because properties of this latter material are more readily available than for other diacyl-morphine compounds to assist in the determination of operating conditions for the subsequent operations of the process.

Acetic anhydride is the acetylating agent of choice for the acylation of morphine in accordance with the requirements of the process. The reaction is accomplished by dissolving a quantity of morphine in an excess of acetic anhydride. Acetic anhydride in amounts of from about 2 to 4 parts to one part of morphine, by weight, has proved in practice to be adequate for this purpose. The resulting solution is heated to a temperature not exceeding the boiling point of acetic anhydride (140° C.) and refluxed at this temperature for a period of about 20 hours to effect the acetylation. Appropriate conditions are employed with other of said acylating reagents to produce a more or less equivalent reaction mixture.

On completion of the acylation reaction, it is desirable to remove the excess acylating reagent. Again, the conditions for removal are determined according to the acyl compound employed. Generally, gaseous acylating agents are vaporized from the mixture while vacuum distillation may be employed to effect the removal of a liquid acyl compound leaving the diacyl-morphine as a residue. It is important to note that diacyl morphine, in the presence of an acid, exhibits a property common to alkaloids, that is, formation of a salt with the acid. In the above described synthesis of diacyl morphine, when an acyl chloride or anhydride is used as the acylating agent, an acid is produced, either directly or indirectly, as a result of the interaction of the acyl compound and the hydroxyl groups of morphine. For instance, hydrochloric acid is the by-product of a morphine-acyl chloride reaction and such acid combines with a portion of the acetylated morphine to give the corresponding salt. On the other hand, a ketene-morphine reaction, being an addition reaction, produces no by-product and therefore no acid, while a morphine-carboxylic acid reaction presupposes the presence of an acid. Accordingly, as indicated above, diacyl-morphine in contact with an acid, however produced, forms a salt with the acid.

The product of such acylation reactions accordingly is a mixture of diacyl-morphine and the diacyl-morphine salt. As this diacyl-morphine salt will not react with the reagent introduced in the second operation of the process, it is essential for best results that whatever diacyl-morphine salt is present be converted to the free base diacyl-morphine. Several methods are suitable for this conversion; one procedure involves admixing the diacyl-morphine, diacyl-morphine salt mixture with a solvent in which the diacyl-morphine is soluble, warming this admixture until solution is complete thereby dissociating the diacyl-morphine salt, such solution being followed by recrystallization and isolation of the freed diacyl-morphine. Another method involves alkaline extraction as follows: the diacyl-morphine, diacyl-morphine salt mixture is dissolved in a water insoluble organic solvent and the solution is contacted with an aqueous solution of an inorganic alkaline salt, whereupon the diacyl-morphine salt dissociates into acid and the free base diacyl-morphine without deacylation of the latter compound. On agitation, the acid and free base distribute into the aqueous and organic phases respectively. Diacyl-morphine is then recovered by separation of the organic phase from the inorganic and evaporation of the organic solvent.

The reagents chosen to effect such conversion, of course, are selected in accordance with the diacyl-morphine compound formed in the first operation. In the event that acetic anhydride is employed to accomplish morphine acylation, the resulting product will be a mixture of both heroin and the salt of heroin and acetic acid, i.e., heroin acetate. The excess reagents, acetic anhydride and acetic acid, may be removed by vacuum distillation, leaving as a residue the heroin, heroin-acetate mixture. Either recrystallization or an alkaline extraction step may then be performed in order to obtain all of the heroin as the free base. Free heroin is obtained by dissolving the above mixture in an excess of heated ethyl acetate and cooling the solution to crystallize the heroin therefrom. The crystallized heroin is separated from the supernatant by filtration and then washed with cold solvent to remove all traces of the solution. In the equally satisfactory alkaline extraction method for recovering all of the heroin as a free base, the heroin, heroin-acetate mixture is dissolved in benzene. The benzene solution is then extracted with several successive portions of a 0.5 M sodium carbonate solution to remove the acetic acid from heroin acetate and the solution is water washed to remove all traces of sodium carbonate. Evaporation of the benzene solution yields free heroin. In any event there is first produced a diacyl derivative of morphine.

The diacyl derivative of morphine, e.g., heroin, is then treated with a cyanating agent to replace the methyl radical of diacyl morphine with a cyano group. Preferably a cyanogen halide is reacted with diacyl-morphine to produce the corresponding cyano-diacyl-morphine. Accordingly, diacyl-morphine is dissolved in an organic solvent, e.g., chloroform which is well known to completely dissolve many of the morphine free-base derivatives. Other low boiling halogenated hydrocarbons may also be employed as a solvent. The diacyl-morphine solution is mixed with a stoichiometric excess of a cyanogen halide dissolved, preferably, in a similar solvent. For ease and efficiency of operation, cyanogen bromide is usually used although the iodide or chloride compounds may be substituted if desired. Because of the high volatility of cyanogen bromide, the cyanation reaction is begun at a low temperature but completed at a temperature sufficiently high to effect refluxing of the mixture, after which, the excess reagent may be removed by evaporation leaving the cyano-diacyl-morphine in the residue with unreacted diacyl-morphine, or unreacted morphine not removed by prior purification steps as likely contaminants. It is usually desirable to separate the cyano-diacyl-morphine from the contaminants before continuing with the process in order to obtain a purified product. Recrystallization of this impure material from an inert organic solvent, or extraction of the contaminants into an acid solution, such as 0.5 M phosphoric acid, are two methods whereby such purification may be accomplished. However, in some cases the end products of such materials may not interfere in the end use of the product and yields are increased by omitting such purification.

The purified or normal reaction product, i.e., cyano-diacyl-morphine is then treated in the superior two-stage acid hydrolytic operation of the invention to remove the cyano and acyl substituents and thereby produce the desired normorphine. Hydrolysis of labile organic compounds such as morphine derivatives in conventional practice is usually performed using dilute hydrolytic reagents with consequent slow and incomplete conversion. Although more rapid and complete hydrolysis occurs in some cases using concentrated agents quite often decomposition may increase disproportionately and therefore a concentrated reagent cannot ordinarily be used. In the present instance it has been found that a concentrated mineral acid may be employed for a limited period of time to obtain a very rapid partial hydrolysis without undue decomposition. Dilution of the reagent with a subsequently slowed hydrolysis rate thenceforth completes the hydrolysis with a large overall saving in time and more efficient conversion to the desired product.

Accordingly, cyano-diacyl-morphine obtained as above is suspended in a quantity of a concentrated hydrolyzing reagent and then warmed gently for approximately five minutes to initiate hydrolysis. A 36% hydrochloric acid solution has proved particularly successful as a hydrolyzing reagent in this initial operation. However, HCl of above about 30% concentration will yield proportionately rapid hydrolyses in accordance with the concepts of the invention. Other hydrolyzing agents, e.g., non-oxidizing acids of comparable strength such as sulfuric, phosphoric and trifluoroacetic acids should behave similarly. Following initial hydrolysis, whereby it is postulated that deacylation is the primary effect, the above suspension is diluted until the acid concentration is reduced preferably to about 5%, and the resulting solution then gently warmed until hydrolysis is complete. HCl in the ranges of about 2 to 10% concentration can also be used. A period of eight hours on a heat source such as a steam bath, or six hours at reflux temperature is usually adequate for this purpose. The milder temperature of the steam bath, however, is preferred in this instance as the possibility of organic decomposition becomes greater as the temperature increases. Under such conditions of dilution, decyanation or removal of the cyano group is the predominant result and normorphine is formed as the dissolved hydrochloric acid salt.

The normorphine hydrochloride is then recovered either as the salt or as the water-insoluble free base. To recover the normorphine hydrochloride salt, it is advisable to first remove any contaminants which may be present. Chloroform extraction of the normorphine salt solution is one method for accomplishing this. Following such extractive purification, the salt solution is evaporated to dryness leaving the crystallized normorphine hydrochloride salt.

Alternatively, the normorphine may be obtained as the free base on dissociation of normorphine salt into acid and free normorphine, e.g., by the addition of concentrated ammonium hydroxide to the normorphine salt solution until the pH thereof is increased to about 9.2 whereupon the normorphine precipitates. The precipitated normorphine is filtered, water washed and dried in air. Ordinary room temperature is adequate for drying this material. The normorphine is obtained as normorphine hydrate in a crystalline form combined with one and one-half water molecules per molecule of free base.

Further details of the practice of the invention will be disclosed in the following with reference to specific examples including comparative results obtained by prior processes.

*Example I*

To obtain as pure a starting material as possible, a 23.1 gram sample of morphine hydrate was prepared by recrystallization of 25 grams of commercially produced morphine hydrate from 200 cc. of aqueous methanol. 23 grams of the recrystallized material was dissolved in 100 cc. of acetic anhydride and heated with refluxing for 20 hours, to quantitatively convert the morphine to diacetyl morphine, or heroin. At the end of the reflux period, acetic anhydride and acetic acid were vacuum distilled from the mixture leaving a heavy colored oil containing both heroin and heroin acetate. To obtain all of this material as free heroin, the following procedure was followed. The oil was dissolved in an excess of ethyl acetate, warmed gently, and decolorized using a highly adsorptive activated carbon (Norit) as a decolorizing agent. The decolorized solution was evaporated on a steam bath to a volume of 50 cc. and then placed overnight in a cold room, whereupon heroin solidified from this solution. After separating heroin from the supernatant solution by filtration, a 6.54 gram portion was dissolved in 30 cc. of chloroform and added, in 15 minutes, to a stirred, ice-cold solution of 2.16 grams of cyanogen bromide in 40 cc. of ethanol-free chloroform. The resulting greenish solution was stirred for 30 minutes at ice-temperature and 30 minutes at room temperature, then heated with refluxing for three hours thereby producing cyanonorheroin. On completion of the cyanation step, the excess reagents were evaporated leaving a residue consisting primarily of cyanonorheroin. In order to obtain this material free from unreacted heroin or morphine, the residue was dissolved in methyl alcohol and the desired cyanonorheroin (M.P. 232–235° C.) crystallized therefrom by cooling. Further work-up of the mother liquor, that is, evaporation of methanol and recovery of the residue indicated a yield of at least 83% cyanonorheroin as based on heroin. A yield of 76% for this step has been reported as obtainable by the conventional method.

5.3 grams of the recrystallized cyanonorheroin was suspended in a quantity of acid sufficient to initiate hydrolysis; in this instance, 24 cc. of concentrated, 36% hydrochloric acid were sufficient for the purpose. The suspension of cyanonorheroin in acid was warmed on a steam bath for five minutes with agitation by swirling, in order to maintain contact between the reactants. The predominant result of this portion of the hydrolysis step was deacetylation. To complete the hydrolysis and bring about decarboxylation of the cyano group under conditions designed to avoid decomposition of the heroin compound, the suspension was diluted by the addition of 190 cc. of water, thereby reducing the hydrochloric acid concentration to approximately 5%, after which the diluted suspension was heated on the steam bath for 8 hours. As hydrolysis proceeded, the solid material went into solution. During hydrolysis the normorphine combined with the hydrochloric acid to form the water-soluble salt, normorphine hydrochloride. To recover the normorphine as the free base, the above solution was filtered to remove foreign particles, and evaporated under reduced pressure to a volume of 100 cc. 27% ammonium hydroxide was then added to the solution until the pH of the solution was about 9.2. The normorphine hydrate (M.P. above 285° C., with decomposition) precipitated thusly was filtered, water washed and air dried. The yield for this operation was 91% normorphine, based on cyanonorheroin, while that obtainable by the conventional method with a two-step potassium hydroxide-hydrochloric acid hydrolysis is 62%. The overall yield of normorphine obtained by the foregoing method is 65% as based on morphine as compared to 50% yields as the best obtainable by the conventional method.

*Example II*

One gram of recrystallized morphine was dissolved in 2.5 cc. of acetic anhydride and heated with refluxing for 20 hours, thus producing heroin. Excess reagents were removed by vacuum distillation and the residue, containing both heroin and heroin acetate, was dissolved in 20 cc. of benzene. This solution was extracted with three 10 cc. portions of 0.5 M sodium carbonate solution in order to convert all heroin acetate to free heroin. Following extraction, the benzene solution was washed twice with 10 cc. of water, then dried over anhydrous sodium sulfate, filtered and evaporated to dryness, thereby isolating heroin. The heroin, in turn, was dissolved in 10 cc. of chloroform, and added to a cold solution of 10 cc. of chloroform containing 0.5 gram of cyanogen bromide. The final solution was stirred 30 minutes at ice temperature, 30 minutes at room temperature, and refluxed for three hours, thus producing cyanonorheroin. Next, the excessive reagents were evaporated by gentle heating to remove all traces of cyanogen bromide. 10 cc. of chloroform was added and the solution evaporated again. In the event that the residue after evaporation contained unreacted morphine and heroin, as well as cyanonorheroin, the following purification step was performed. The residue was dissolved in 25 cc. of chloroform and the resulting solution mixed with 15 cc. of 0.5 M phosphoric acid, thereby extracting the contaminants into the acid phase. The acid portion was discarded and the extraction step repeated three more times, after which the chloroform solution was dried over anhydrous sodium sulfate, filtered and evaporated to dryness, thus accomplishing the isolation of purified cyanonorheroin. In order to hydrolyze this latter compound to normorphine, the cyanonorheroin was suspended in 5 cc. of concentrated, 36% hydrochloric acid, and agitated with warming on a steam bath for 5 minutes. At the end of the five minute period 40 cc. of water was added and this solution refluxed for six hours. As hydrolysis proceeded, the produced normorphine combined with the hydrochloric acid to form the water-soluble salt normorphine hydrochloride. In order to remove any unreacted or incompletely hydrolyzed material, the aqueous acidic solution of normorphine hydrochloride was extracted with three successive 5 cc. portions of chloroform, to remove alkaloidal contaminants. Following extraction, the aqueous phase was filtered to remove foreign particles, and evaporated to dryness. Normorphine hydrochloride remained as the residue after evaporation. Based on morphine, a 74% yield of normorphine hydrochloride was obtained by the above procedure. It is, of course, obvious that the normorphine hydrochloride so obtained may be converted to free normorphine with no appreciable change in yield, by substitution of the neutralization step described in Example I in place of the evaporation step performed here.

While representative embodiments of the invention have been described, modifications may be made therein without departing from the concepts of the invention and it is intended to cover all such as fall within the scope of the appended claim.

What is claimed is:

The process for converting diacetyl-cyanonormorphine into normorphine comprising hydrolyzing said diacetyl-cyanonormorphine in a concentrated hydrochloric acid solution at 100° C. for a time less than that required to produce destructive decomposition thereby forming cyanonormorphine, and subsequently diluting the cyanonormorphine-concentrated hydrochloric acid solution in order to effect hydrolysis of the cyano groups from the cyanonormorphine thereby producing normorphine.

References Cited in the file of this patent

Von Braun: Berichte, vol. 47, pp. 2312–30.
Bentley: The Chemistry of the Morphine Alkaloids, 1954, Oxford, New York, pp. 19 and 25.